Patented Feb. 17, 1953

2,628,944

UNITED STATES PATENT OFFICE 2,628,944

LEAD ACTIVATED CALCIUM ZINC SILICATE PHOSPHOR AND METHOD OF MAKING SAME

Rudolph Nagy, Upper Montclair, N. J., assignor to Westinghouse Electric Corporation, East Pittsburgh, Pa., a corporation of Pennsylvania No Drawing. Application January 30, 1951, Serial No. 208,673

10 Claims. (Cl. 252—301.6)

This invention relates to phosphors and methods of making and, more particularly, to an improved phosphor for the production of long wave ultraviolet radiations, or so-called "black light."

The principal object of my invention, generally considered, is to produce an efficient phosphor of the lead-activated calcium silicate type, in which zinc replaces part of the calcium.

Another object of my invention is to produce a lead-activated calcium zinc silicate phosphor, with the optimum ratio between the calcium and the zinc.

A further object of my invention is to produce a lead-activated calcium zinc silicate phosphor excitable by 2537 A. U. radiations, having its range of emission between 3000 A. U. and 4000 A. U., and with a peak at about 3450 A. U.

A still further object of my invention is to produce a lead-activated calcium zinc silicate phosphor, including the addition of about 2.5% to 5% of the calcium proportion as the sulphate, and preheating at a temperature between 700° C. and 1000° C. before the final firing at about 1050° C.

Other objects and advantages of the invention will become apparent as the description proceeds.

In investigating the various ultraviolet emitting phosphors, I found that lead-activated calcium silicate phosphor can be used as a substitute for calcium cerium phosphate phosphor. The peak of emission of the former is at 3300 A. U. However the plaque measurement is only 60, compared with calcium cerium phosphate as 100. However, both the peak emission and the output can be altered by proper variation of the constituents. Both calcium and silica are abundant and relatively inexpensive; an ideal situation from the manufacturing point of view.

I took calcium silicate and substituted zinc for a portion of the calcium, in the ratio of one mole of zinc to two moles of calcium. The proportion of silica was then varied from 2 to 4 moles for every 3 moles of cation. Lead fluoride was used as an activator and kept constant at .029 mole. In manufacturing, the mixed raw materials were first heated for 2 hours at 1000° C. and then for 3 hours at 1050° C. The plaque output from such materials varied from about 64 with two moles of silica to three moles of cation, to a maximum of about 103 when between 2.8 of 3 moles of silica were used for every 3 moles of cation, compared with the output of unmodified calcium cerium phosphate phosphor considered as 100. The plaque output was obtained by exposing the phosphor to 2537 A. U. radiations and measuring the visible fluorescence resulting from the long wavelength ultraviolet radiations impinging on zinc sulphide phosphor. It was found that the optimum silica ratio is between 2.8 and 3.6 moles per 3 moles of cation. Since with most silicates it is desirable to use a slight excess of silica, I prefer a formula having 3.4 moles of silica per 3 moles of cation.

The ratio of calcium to zinc was varied from one extreme of 1 to 2 to the other of 3 to 0. The optimum ratio is considered to be two moles of calcium for every mole of zinc, giving an increase in output of about 60%, as compared with unmodified lead-activated calcium silicate.

In manufacturing my improved phosphor, I first fired the ingredients at 1000° C. Since the product did not show excessive sintering, the temperature was raised to 1050° C. This higher temperature was used with the result that all phosphors had a comparatively low output. To overcome this I tried preheating at a lower temperature. To determine the optimum temperature of preheat, batches were heated at various temperatures from 700° C. to 1050° C. The results, given in Table I, show that preheating increases the output.

Table I.—*The effect of preheat on the output of the calcium-zinc silicate phosphor*

| Preheat Temperature, ° C. | Output after 3 Hours' Final Heating at 1150° C. |
|---|---|
| 700 | 103.6 |
| 800 | 102.8 |
| 900 | 102.8 |
| 1,000 | 105.4 |
| 1,050 | 92.4 |

In view of the foregoing results, I preheated all subsequent batches at 950° C. before a final heating at 1050° C. The length of time of firing was determined by repeated one hour firings until the output began to decrease. This indicated that by prolonged heating the lead activator was being removed from the lattice. A 300 gram batch required a minimum time of 3 hrs. at 1050° C. to obtain maximum output after the initial 1 hr. preheat at 950° C.

The amount of lead was varied from 0.2% to 1.6%, obtaining the highest output with 1%.

The activator was successively employed as the oxide, fluoride, carbonate, and nitrate. After one hour of heating, lead fluoride gave the highest plaque output. However, after three hours of heating the output was the same for the different lead salts. Eleven impurities in two different concentrations were added to the phosphor to determine their effect on the output. Of these, calcium sulphate, barium sulphate, thallium sulphate, and thorium nitrate increased the output. When the chlorides of these metals were added, the output decreased. The greatest increase was obtained with calcium sulphate. So I decided that the sulphate radical was beneficial in the formation of this phosphor. The optimum ratio is considered to be 0.019 mole of calcium sulphate for each mole of calcium carbonate.

The formula for manufacturing a preferred phosphor embodying my invention, and which has a plaque brightness comparable to calcium cerium phosphate, is as follows:

EXAMPLE I

| | |
|---|---|
| Calcium carbonate (oxide, or corresponding amount of calcium as other compound breaking down to the oxide on heating) | 2.0 moles. |
| Calcium sulphate | 0.038 mole (or about 2.5% of the CaCO$_3$). |
| Zinc oxide (or corresponding amount of zinc as other compound breaking down to the oxide on heating) | 1.0 mole. |
| Silica (or silicic acid) | 3.4 moles. |
| Lead Fluoride | 0.029 mole (or about 1% Pb). |

Other examples are as follows:

EXAMPLE II

| | |
|---|---|
| Calcium carbonate | 2½ moles. |
| Zinc oxide | ½ mole. |
| Silica | 4 moles. |
| Lead compound | 0.06 mole of lead. |

EXAMPLE III

| | |
|---|---|
| Calcium carbonate | 1½ moles. |
| Zinc oxide | 1½ moles. |
| Silica | 3 moles. |
| Lead compound | 0.01 mole of lead. |

I have found that the spectral distribution of calcium zinc silicate phosphor extends from 3000 A. U. to about 4000 A. U. with a peak at 3450 A. U. Calcium silicate activated with lead peaks at 3300 A. U. This entirely new emission band definitely demonstrates the formation of a new phosphor which has an output higher than that of calcium cerium phosphate, which has been used as an ultraviolet or "black light" emitting phosphor. The quantum efficiency of my new phosphor may be as high as that of barium silicate phosphor or calcium cerium phosphate as evidenced by plaque measurements.

Lead-activated calcium zinc phosphors embodying my invention, with different compositions and heat treatments, were studied by means of X-ray diffraction. Powder technique was employed, using an iron tube as the X-ray source. The results of the X-ray analysis is shown in Table II. The diffraction lines of batch (1) corresponded to the α Wollastonite structure. When it was fired at 1240° C., the obtained pattern, batch (2), matches calcium meta silicate or β Wollastonite. This pattern also agrees with the high temperature form of lead-activated calcium silicate fired at 1180° C., as reported by Fonda and Froelich, Jour. Electrochem. Soc., vol. 93, pp. 114–122, 1948.

For calcium zinc silicate activated by lead, where the ratio of calcium to zinc is 2 to 1, a new X-ray pattern is obtained. The patterns for batches (3), (4) and (5) are identical. This pattern, corresponds to Hardystonite, a mineral having the composition Ca$_2$ZnSi$_2$O$_7$. Batch (6) is composed of pattern Hardystonite and a small amount of Zn$_2$SiO$_4$. This indicates that the reaction is not quite complete under such firing condition. It indicates a desired longer firing time, higher firing temperature, or one in an atmosphere of steam, to complete the reaction. In batch (7) the diffraction lines are weak and diffuse. However, in general it resembles Hardystonite. When the ratio of calcium to zinc is 1 to 2, batch (8), there is a mixture of Zn$_2$SiO$_4$, see batch (9), and a phosphor Ca$_2$ZnSi$_2$O$_7$. The table follows:

*Table II.—X ray analysis of calcium zinc silicate phosphors*

| Batch | Substance | Ratio, Ca to Zn | Firing time, hrs. | Firing temperature ° C. | X-ray Pattern |
|---|---|---|---|---|---|
| (1) | Ca silicate : Pb | | 2 | 1,050 | α Wollastonite. |
| (2) | do | | 2 | 1,240 | β Wollastonite. |
| (3) | Ca zinc silicate : Pb | 2 to 1 | 2 | 1,200 | Hardystonite. |
| (4) | do | 2 to 1 | 2 | ¹1,050 | Do. |
| (5) | do | 2 to 1 | 16 | 1,050 | Do. |
| (6) | do | 2 to 1 | 2 | 1,050 | Hardystonite and Zn$_2$SiO$_4$. |
| (7) | do | 2.6 to 0.4 | 2 | 1,050 | Hardystonite. |
| (8) | do | 1 to 2 | 2 | 1,050 | Zn$_2$SiO$_4$ and Hardystonite. |
| (9) | Zinc silicate | | 2 | 1,050 | Zn$_2$SiO$_4$. |

¹ In steam.

In summary, I would say that the substitution of zinc for some calcium in calcium silicate increases the ultraviolet fluorescent output from about 60 to 102, on an arbitrary scale. The optimum mole ratio of calcium oxide, zinc oxide, silica, and lead are found to be 2 to 1 to 3.4 to .029. The permissible range for the calcium compound is between 1 and 2½ moles of calcium, with desirably between 0.0 to 0.06 mole as the sulphate; that for the zinc compound between 2 and 0.5 mole of zinc, that for the silica between 2½ and 4 moles; and that for the lead between 0.003 and 0.06 mole, or from approximately $\tfrac{1}{10}$% to 2%. However, in any event, the sum of the moles of calcium and zinc should be 3, if the other variations are to be valid. The optimum final firing temperature is 1050° C., preferably after one hour of preheat at a temperature between 700° C. and 1000° C., or preferably at about 950° C. Of the various impurities tested, only the sulphate and fluoride radicals are found to have a beneficial effect on the output. The use of activators other than lead, were not effective in producing any appreciable ultraviolet fluorescence. The spectral distribution of the calcium zinc silicate phosphor with a peak at 3450 A. U. demonstrates that it is a phosphor new and different from calcium silicate.

The foregoing informaiton may be condensed by saying that my improved phosphor has a theoretical mole formula as follows:

$$wCaO.xZnO.ySiO_2.zPb$$

(in a compound); in which $w$ is a number lying in the range between and including 2½ and 1, $x$ is a number lying in the range between and including ½ and 2, $y$ is a number lying in the range between and including 2½ and 4, $z$ is a number lying in the range between and including .003 and .06, and the sum of $w$ and $x$ is 3.

Although preferred embodiments of my invention have been described, it will be understood that modifications may be made within the spirit and scope of the appended claims.

I claim:

1. The luminescent composition comprising calcium silicate activated by lead and including between about 2½ and 4 moles of silica, in which zinc replaces part of the calcium in the ratio of between about ½ and 2 moles of zinc to between about 2½ and 1 mole of calcium.

2. A luminescent composition particularly adapted to emitting ultraviolet radiation, comprising the fired reaction product of calcium oxide, zinc oxide and silica in the approximate mole proportions of two to one to three and four tenths, and activated by lead.

3. A lead-activated calcium zinc silicate phosphor, having its range of mole ratios of zinc to calcium between ⅕ and 2, and its range of mole ratios of silica between 2.8 and 3.6 moles per 3 moles of cation, emission between 3000 A. U. and 4000 A. U., with a peak at about 3450 A. U., and excitable by 2537 A. U. radiations.

4. A luminescent composition comprising calcium zinc silicate activated by about 1% of lead, in which about one-third the cation mole proportion, exclusive of the lead, is zinc, and in which the mole ratios of silica are between 2.8 and 3.6 moles per 3 moles of cation.

5. A luminescent composition particularly adapted emitting long-wave ultraviolet radiations, comprising the fired reaction product of the following constituents in about the stated proportions: calcium compound, oxide equivalent, 1 to 2.5 moles; calcium sulphate, 0 to .06 mole; zinc compound, oxide equivalent, 2 to ½ mole; silica, 2.5 to 4 moles; lead, 0.003 to 0.06 mole; with the sum of the calcium and zinc equalling 3 moles.

6. A luminescent composition particularly adapted for emitting long wave ultraviolet radiations, comprising the fired reaction product of the following constituents in about the stated proportions: calcium carbonate, 2 moles; calcium sulphate, 0.038 mole; zinc oxide, 1 mole; silica, 3.4 moles; and lead fluoride, 0.029 mole.

7. A luminescent composition comprising lead-activated calcium zinc silicate having the gram molecular formula $wCaO.xZnO.ySiO_2.zPb$ (in a compound); in which $w$ is a number lying in the range between and including 2½ and 1, $x$ is a number lying in the range between and including ½ and 2, $y$ is a number lying in the range between and including 2½ and 4, $z$ is a number lying in the range between and including .003 and .06, and the sum of $w$ and $x$ is 3.

8. The method of producing lead-activated calcium zinc silicate phosphor, comprising adding compounds of calcium, zinc, silicon and lead necessary to make the phosphor, the proportions being 1 to 2.5 moles of the calcium compound, oxide equivalent, 2 to ½ mole of the zinc compound, oxide equivalent, 2.5 to 4 moles of silica, and 0.003 to 0.06 mole of the lead compound, with the sum of the calcium and zinc equaling about 3 moles, including about 2.5% of the calcium compound proportion as the sulphate, and preheating the ingredients at a temperature between 700° C. and 1000° C. before the final firing at 1050° C.

9. The method of producing lead-activated calcium zinc silicate phosphor, comprising adding compounds of calcium, zinc, silicon and lead necessary to make the phosphor, the proportions being 1 to 2.5 moles of the calcium compound, oxide equivalent, 2 to ½ mole of the zinc compound, oxide equivalent, 2.5 to 4 moles of silica, and 0.003 to 0.06 mole of the lead compound, with the sum of the calcium and zinc equaling about 3 moles, and including in the mix before firing about 2.5% to 5% of the calcium in the form of the sulphate.

10. The method of producing lead-activated calcium zinc silicate phosphor, comprising preheating compounds of calcium, zinc, silicon and lead necessary to make the phosphor, the proportions being 1 to 2.5 moles of the calcium compound, oxide equivalent, 2 to ½ mole of the zinc compound, oxide equivalent, 2.5 to 4 moles of silica, and 0.003 to 0.06 mole of the lead compound, with the sum of the calcium and zinc equaling about 3 moles, at a temperature between 700° C. and 1000° C. and then firing at about 1050° C.

RUDOLPH NAGY.

REFERENCES CITED

The following references are of record in the file of this patent:

UNITED STATES PATENTS

| Number | Name | Date |
|---|---|---|
| 2,299,510 | Steadman | Oct. 20, 1942 |
| 2,471,082 | Schulman | May 24, 1949 |

OTHER REFERENCES

Kroger: "Some Aspects of Luminescence of Solids," Elsevier Pub. Co., 1948, p. 275.